No. 659,741. Patented Oct. 16, 1900.
M. G. GRAHAM.
WHEEL CULTIVATOR.
(Application filed June 8, 1900.)
(No Model.) 3 Sheets—Sheet 1.
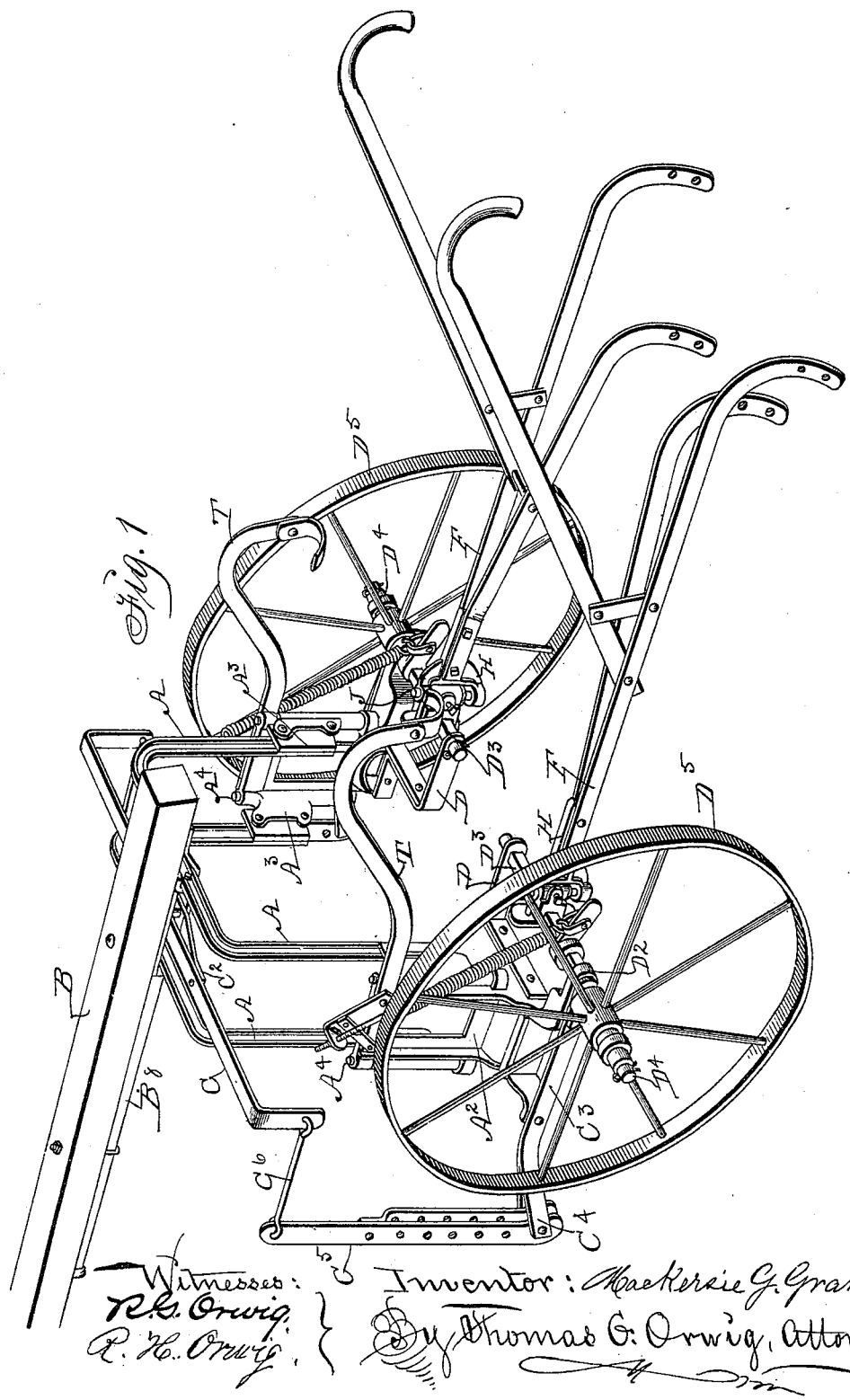

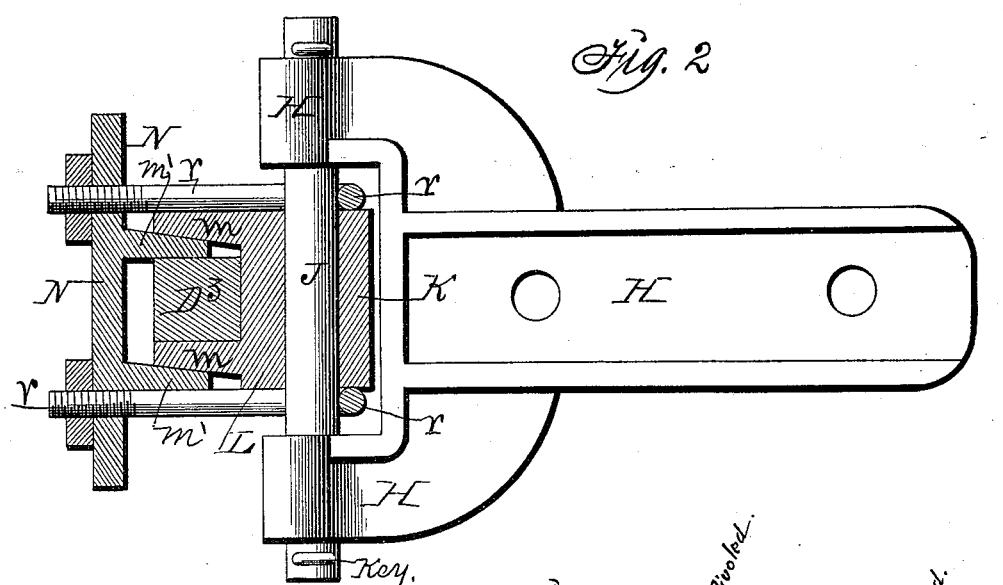
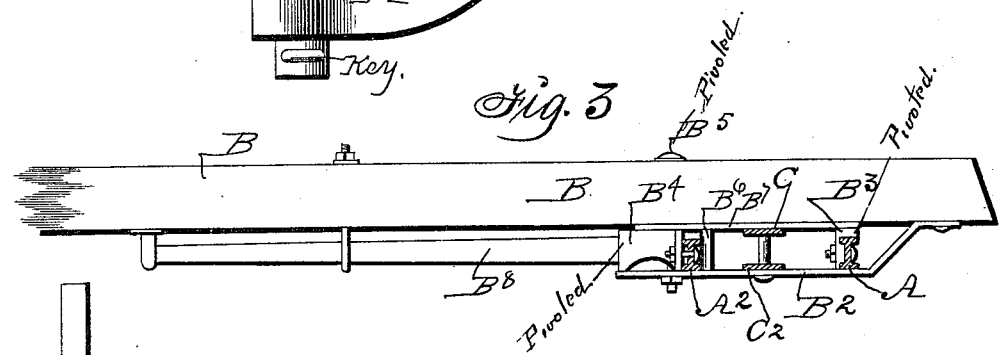
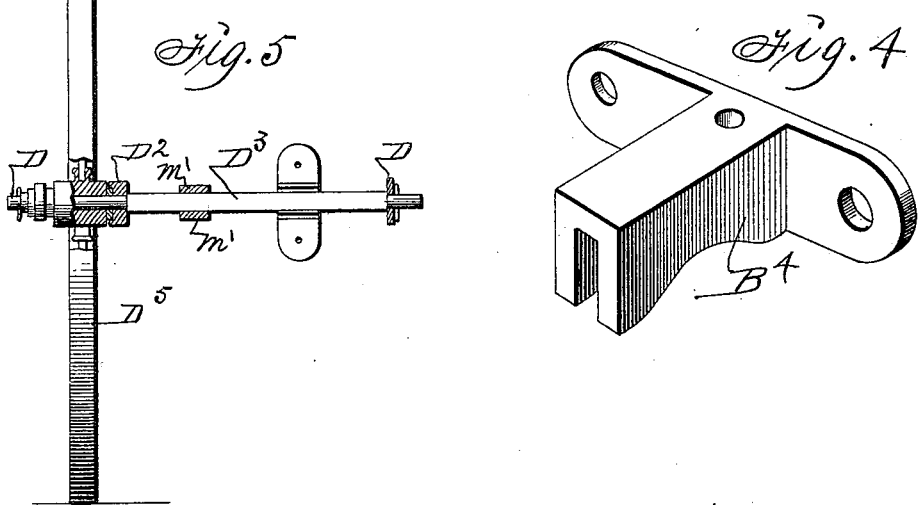

No. 659,741. Patented Oct. 16, 1900.
M. G. GRAHAM.
WHEEL CULTIVATOR.
(Application filed June 8, 1900.)
(No Model.) 3 Sheets—Sheet 3.
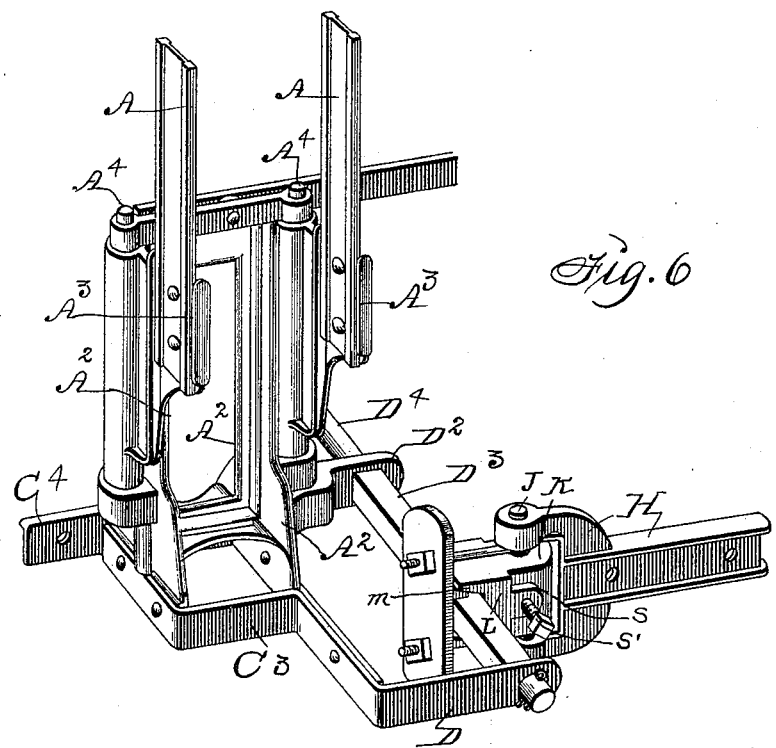
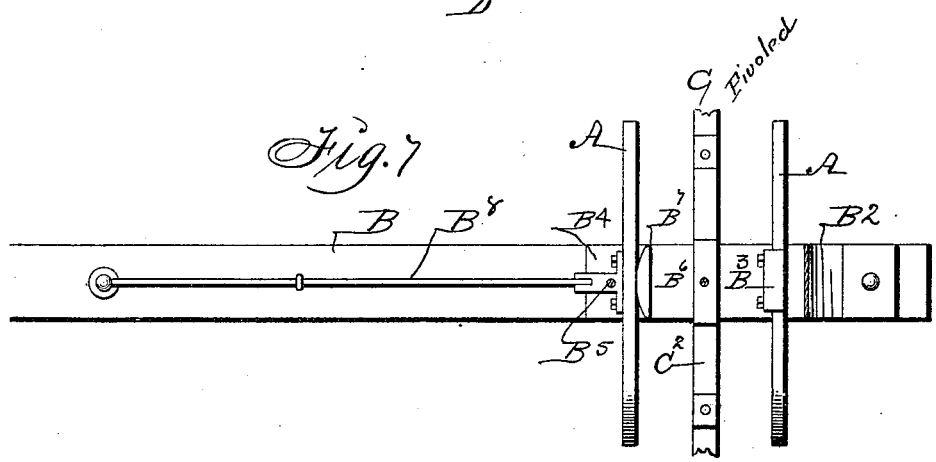

UNITED STATES PATENT OFFICE.

MUCKERSIE G. GRAHAM, OF OTTUMWA, IOWA.

WHEEL-CULTIVATOR.

SPECIFICATION forming part of Letters Patent No. 659,741, dated October 16, 1900.

Application filed June 8, 1900. Serial No. 19,645. (No model.)

*To all whom it may concern:*

Be it known that I, MUCKERSIE G. GRAHAM, a citizen of the United States, residing at Ottumwa, in the county of Wapello and State of Iowa, have invented a new and useful Wheel-Cultivator, of which the following is a specification.

My object is to provide an improved wheel-cultivator that can be advantageously operated as required to kill weeds and loosen the ground between rows of plants.

My invention consists in the construction, arrangement, and combination of an arched frame composed of two mating parts hinged to auxiliary frames, a pole pivotally connected with the arched frame, a leaf-spring fixed to the pole to normally retain the pole at right angles to the arched frame and in alinement with the line of advance, an evener pivotally connected with the top of the arched frame and the pole, levers connected with the ends of the evener and auxiliary frames at the ends of the arched frame, angular rock-shafts having journals for traction-wheels at their ends adjustably connected with the auxiliary frames for raising and lowering beams, beams having fixed standards carrying shovels hinged to the auxiliary frames to allow free lateral motion and vertical motion and to retain the shovels perpendicular, and means for preventing irregular movements of horses to be communicated to the carriage and shovels while in operation in a field.

In the accompanying drawings, Figure 1 is a perspective view of my complete invention ready for practical use and shows the relative positions of all the parts. Fig. 2 is an enlarged view, partly in section, showing how the cultivator-beams are detachably and adjustably connected with the angular portions of the axles. Fig. 3 is a side view of the rear end portion of the pole, showing the leaf-spring fixed to its under side and extended into a slot in an iron fixed to the front arched member A of the mating parts of the arched frame shown in cross-section. Fig. 4 is an enlarged perspective view of the slotted iron into which the free end of the leaf-spring on the under side of the pole extends as required to normally retain the arched frame in a right-angled position relative to the pole and the line of advance. Fig. 5 is a fragmentary view, partly in section, showing how the traction-wheels are connected with the angular rock-shafts having journals on their ends and the auxiliary frames to which the mating members of the arched frame are hinged. Fig. 6 is an enlarged perspective view showing how the ends of the mating members of the arched frame are hinged to the auxiliary frames, also how angular rock-shafts are fixed to the auxiliary frames and how the cultivator-beams are detachably and adjustably connected with the rock-shaft as required to provide vertical and also horizontal motion of the beam and standards fixed thereto to carry shovels. Fig. 7 is a plan view showing the relative positions of the mating members A of the arched frame and the devices used for pivotally connecting the arched frame with the pole.

The letter A designates mating arched bars, preferably made of angle-iron, and $A^2$ represents mating auxiliary cast-iron frames that have knuckles at their top and bottom portions, to which hinge-irons $A^3$, fixed to the lower ends of the arched bars A, are pivotally connected by means of pins or bolts $A^4$, as clearly shown in Fig. 6, and in such a manner that the arched frame may deflect from a right-angled position relative to the auxiliary frames, the pole and the traction-wheels connected with the auxiliary frames and the line of advance.

B is a pole pivotally connected with the centers of the mating members A of the arched frame by means of a bar $B^2$, bent upward at its rear end and fixed to the under side of the pole and provided with a pivoted cross-piece $B^3$, to which the rear member A is bolted, and pivoted metal frame $B^4$, to which the front member A is bolted fast, and a coupling-bolt $B^5$, that extends down through coinciding holes in the pole, the frame $B^4$, and the front end portion of the fixed bar $B^2$.

$B^6$ is a metal plate fixed to the under side of the pole B, and $B^7$ is a fixed fulcrum upon which the front member A of the arched frame vibrates relative to the pole and the metal frame or bar $B^2$, which is bolted fast to the pole.

$B^8$ is a leaf-spring fixed to the under side of the pole B at its front end portion, and its free rear end is extended into a central slot in the front portion of the frame $B^4$ in such a manner that the spring will normally retain the pole in a right-angled position with the mating arched frame members A.

C is an evener composed of a straight flat metal bar bent downward at its end portions and a curved bar $C^2$, fixed to its under side and central portion. The two parts are provided with coinciding holes and pivoted to the pole B and plate $B^2$ midway between the arched member A by means of a bolt in such a manner that the evener can vibrate independently.

$C^3$ represents flat metal bars fitted and fixed to the lower ends of the auxiliary frames $A^2$ and have integral right-angled extensions $C^4$ at their front ends. $C^5$ represents levers pivoted to the free ends of said extensions to project vertically and their top ends flexibly connected with the ends of the evener C by means of links $C^6$. These levers $C^5$ are adapted for adjustably connecting singletrees therewith for hitching horses thereto as required to apply draft force to the cultivator that will be distributed evenly to the carriage by means of the evener and levers.

Right-angled extensions D of the bars $C^3$ and horizontal projections $D^2$ at the bottoms of the auxiliary frames $A^2$ serve as bearers for the rock-shafts $D^3$, that are journaled thereto and terminate in axles $D^4$, upon which are mounted traction-wheels $D^5$.

Beams F, that have fixed standards adapted for detachably connecting shovels therewith and fixed handles for governing them, are detachably and adjustably connected with the angular rock-shafts $D^3$ by means of clevises H, fixed to their front ends, pins J, connected with the clevises, knuckles K, and clamping-irons L, as shown in Fig. 2, in such a manner that the beams will have lateral motion and also vertical motion. The irons L have vertical bores through which the pins J extend and horizontal mating projections $m$, that have inclined faces on their inner sides, and washer-plates N, having integral extensions $m'$ and inclined on their outer faces, are fitted to the angular rock-shafts $D^3$, and the plates N are connected with the pins J by means of eyebolts $r$ in such a manner that the clevises H and the beams F can be raised and lowered in perpendicular planes and advanced in alinement with the line of advance and the wabbling and zigzag motions incident to the operation of cultivators prevented and shovels carried by the standards allowed to cut close to the plants without being deflected to damage plants. Keys passed through apertures in the lower ends of the pins J retain the pins in their place and allow the knuckles K to be adjusted on the pins while the pins remain stationary in the clevises.

Lugs $s$, integral with the irons L on the pins J, overlie the knuckles K and carry set-screws $s'$, as shown in Fig. 1, by means of which the set-screws extended through bores in the knuckles will clamp the knuckles to the pins J, and vertical adjustment of the beams relative to the rock-shafts $D^3$ and the ground is thus advantageously provided, as well as vertical motion and horizontal motion.

Spring-actuated levers T, having hooks on their ends, are pivoted to the auxiliary frame $A^2$ to support the cultivators elevated and inoperative whenever desired.

Having described the construction and function of each element and arrangement and combination of all the parts, the practical operation and utility of my invention will be readily understood by persons familiar with the art to which it pertains.

What I claim as new, and desire to secure by Letters Patent, is—

1. In a wheel-cultivator, an arched frame, auxiliary frames hinged to the ends of the arched frame and mounted upon wheels, a pole pivoted to the top and center of the arched frame to allow lateral motion of the free end of the pole relative to said arched frame and auxiliary frames and a spring for normally retaining the pole at right angles to the arched frame, arranged and combined to operate in the manner set forth for the purposes stated.

2. In a wheel-cultivator, an arched frame, an auxiliary frame hinged to each end of the arched frame, axles fixed to said auxiliary frames, traction-wheels on the axles, a pole pivoted to the top and center of the arched frame, a device fixed to the arched axle to engage the free end of a spring, a leaf-spring fixed to the pole to engage said device, arranged and combined to operate in the manner set forth, for the purposes stated.

3. In a wheel-cultivator, an arched frame, a flat bar bent upward at its rear end and said rear end fixed to the rear end of a pole, a flat metal plate fixed to the under side of the pole, a cross-piece pivoted between the rear and parallel end portions of said flat bar and flat plate, the rear member of an arched frame composed of two mating parts fixed to said pivoted cross-piece, a metal frame fitted between the front end portions of said flat bar and flat plate, the front member of the arched frame fixed to said metal frame, a coupling-pin extended through coinciding holes in the pole, the flat bar and flat plate fixed to the under side of the pole and the frame fitted between the said flat bar and plate, a fulcrum fixed between said flat bar and plate to engage the front member of the arched frame and a leaf-spring fixed to the under side of the pole, to extend into an opening in the frame to which the front member of the arched frame is fixed, all arranged and combined to operate in the manner set forth for the purposes stated.

4. In a wheel-cultivator, a pole, two mating members of an arched frame, a plate or bar fixed at its rear end to the pole, a cross-piece pivoted on top of said bar and fixed to the center of the rear mating member of said arched frame, a fulcrum fixed on top of the said bar to engage the front mating member of the arched frame, a frame pivotally connected with the pole and provided at its front end with a slot to admit the end of a spring, the front member of the arched frame fixed to said pivoted frame and a leaf-spring fixed to the under side of the pole and its free end extended into the slot of said pivoted frame, all arranged and combined to operate in the manner set forth for the purposes stated.

5. In a wheel-cultivator, an arched frame composed of two mating members, a pole pivotally connected with the top and center of said frame, means for normally retaining the pole at right angles to the frame and an evener pivotally connected with the pole, to operate in the manner set forth for the purposes stated.

6. In a wheel-cultivator, an arched frame composed of two mating members, auxiliary frames hinged to the lower ends of said mating members of the arched frame, a pole pivotally connected with the center of the arched frame, means for normally retaining the pole at right angles to the arched frame, an evener pivoted to the under side of the pole and between the mating parallel members of the arched frame, levers pivoted to lateral extensions at the lower ends and fronts of the auxiliary frames and connected at their top ends with the ends of said evener, by means of straight links, and adapted to support singletrees, arranged and combined to operate in the manner set forth, for the purposes stated.

7. In a wheel-cultivator, an arched frame, an auxiliary frame hinged to each end of the arched frame, horizontal projections at the lower ends of the auxiliary frames extending rearward and adapted to support a rock-shaft, angular rock-shafts journaled to said horizontal projections and each rock-shaft terminating in an axle for a traction-wheel, and means for detachably and adjustably connecting a cultivator-beam with each rock-shaft, arranged and combined to operate in the manner set forth for the purposes stated.

8. In a wheel-cultivator, a rock-shaft in bearings fixed to the frame and terminating in an axle for a wheel, a clevis on the end of a beam, a pin extended vertically through the clevis, a knuckle adjustably hinged to the pin and provided with mating horizontal extensions that have inclined inside faces, a washer having mating horizontal extensions and their outside faces inclined and their inside faces fitted to an angular portion of the rock-shaft, and eyebolts connected with the pin and the washer-plate for clamping the rock-shaft to a knuckle on the pin and means for adjusting the knuckle on the pin and fastening it to the pin at different points of elevation relative to the clevis, all arranged and combined to operate in the manner set forth for the purposes stated.

9. A wheel-cultivator comprising an arched frame, auxiliary frames hinged to the lower ends of the arched frame, a pole pivoted to the center of the arched frame, an evener pivotally connected with the center of the arched frame, levers connected with the ends of the evener and the auxiliary frames to support singletrees, rock-shafts rigidly connected with the auxiliary frames and terminating in axles to support wheels, traction-wheels on said axles, cultivator-beams having fixed clevises on their ends and means for hinging the clevises to said rock-shafts, all arranged and combined to operate in the manner set forth for the purposes stated.

10. A wheel-cultivator comprising an arched frame, auxiliary frames hinged to the lower ends of the arched frame, a pole pivoted to the center of the arched frame, an evener pivotally connected with the center of the arched frame, levers connected with the ends of the evener and the auxiliary frames to support singletrees, rock-shafts rigidly connected with the auxiliary frames and terminating in axles to support wheels, traction-wheels on said axles, cultivator-beams having fixed clevises on their ends, pins fixed in the clevises, knuckles hinged to the pins and provided with extensions for clamping them to the rock-shafts, washer-plates having extensions to stride the axles, eyebolts for clamping the washer-plates to the knuckles and means for adjusting and fastening the knuckles on the pins, all arranged and combined to operate in the manner set forth for the purposes stated.

MUCKERSIE G. GRAHAM.

Witnesses:
W. M. BLACK,
THOMAS G. ORWIG.